US009840621B2

(12) United States Patent
South et al.

(10) Patent No.: US 9,840,621 B2
(45) Date of Patent: Dec. 12, 2017

(54) COMPOSITIONS COMPRISING LIGNOCELLULOSIC BIOMASS AND ORGANIC SOLVENT

(71) Applicant: Fibria Innovations Inc., Vancouver (CA)

(72) Inventors: Colin Robert South, Lexington, MA (US); Mikhail Yurevich Balakshin, North Vancouver (CA); Ewellyn Capanema, North Vancouver (CA)

(73) Assignee: Fibria Innovations Inc., Vancouver (CA)

( * ) Notice: Subject to any disclaimer, the term of this patent is extended or adjusted under 35 U.S.C. 154(b) by 0 days.

(21) Appl. No.: 14/028,333

(22) Filed: Sep. 16, 2013

(65) Prior Publication Data

US 2014/0046041 A1 Feb. 13, 2014

Related U.S. Application Data

(63) Continuation of application No. PCT/CA2012/000265, filed on Mar. 23, 2012.

(60) Provisional application No. 61/467,319, filed on Mar. 24, 2011.

(51) Int. Cl.
C08L 97/02 (2006.01)
C08H 8/00 (2010.01)
D21C 1/04 (2006.01)
C08L 97/00 (2006.01)
C07G 1/00 (2011.01)
C08K 5/05 (2006.01)

(52) U.S. Cl.
CPC ............... *C08L 97/02* (2013.01); *C07G 1/00* (2013.01); *C08H 8/00* (2013.01); *C08K 5/05* (2013.01); *C08L 97/005* (2013.01); *D21C 1/04* (2013.01)

(58) Field of Classification Search
CPC ............. C07G 1/00; D21C 3/20; C08L 97/02
See application file for complete search history.

(56) References Cited

U.S. PATENT DOCUMENTS

| | | |
|---|---|---|
| 1,358,164 A | 11/1920 | Kottinger |
| 2,934,531 A | 4/1960 | Gardon et al. |
| 2,977,352 A | 3/1961 | Gardon et al. |
| 3,461,082 A | 8/1969 | Otani et al. |
| 3,546,199 A | 12/1970 | Christian et al. |
| 3,585,104 A | 6/1971 | Kleinert |
| 4,100,016 A | 7/1978 | Diebold et al. |
| 4,279,788 A | 7/1981 | Lambuth |
| 4,326,036 A | 4/1982 | Hayes |
| 4,409,032 A | 10/1983 | Paszner et al. |
| 4,470,851 A | 9/1984 | Paszner et al. |
| 4,486,557 A | 12/1984 | Gaul et al. |
| 4,594,130 A | 6/1986 | Chang |
| 4,764,596 A * | 8/1988 | Lora ............... C07D 307/50 162/16 |
| 4,918,167 A | 4/1990 | Glasser et al. |
| 4,964,596 A | 10/1990 | Ganssle et al. |
| 4,968,771 A | 11/1990 | Baxter |
| 5,173,527 A | 12/1992 | Calve |
| 5,196,460 A | 3/1993 | Lora et al. |
| 5,202,403 A | 4/1993 | Doering |
| 5,223,601 A | 6/1993 | Chum et al. |
| 5,344,921 A | 9/1994 | Sudo et al. |
| 5,373,070 A | 12/1994 | Gardziela et al. |
| 5,382,608 A | 1/1995 | Gardzielia et al. |
| 5,411,594 A | 5/1995 | Brelsford |
| 5,424,417 A | 6/1995 | Torget et al. |
| 5,681,427 A | 10/1997 | Lora et al. |
| 5,730,837 A | 3/1998 | Black et al. |
| 5,756,098 A | 5/1998 | Price et al. |
| 5,788,812 A | 8/1998 | Agar et al. |
| 5,879,463 A | 3/1999 | Proenca |
| 5,911,276 A | 6/1999 | Kieke |
| 5,916,780 A | 6/1999 | Foody et al. |
| 6,022,419 A | 2/2000 | Torget et al. |
| 6,039,276 A | 3/2000 | Hatt et al. |
| 6,172,204 B1 | 1/2001 | Sarkanen et al. |
| 6,179,958 B1 | 1/2001 | Lysen et al. |
| 6,228,177 B1 | 5/2001 | Torget |
| 6,258,175 B1 | 7/2001 | Lightner |
| 6,281,328 B1 | 8/2001 | Sartori et al. |
| 6,342,378 B1 | 1/2002 | Zhang et al. |

(Continued)

FOREIGN PATENT DOCUMENTS

| | | |
|---|---|---|
| CA | 1136326 A1 | 11/1982 |
| CA | 1201115 A | 2/1986 |

(Continued)

OTHER PUBLICATIONS

Xu, F., et al., "Comparative study of organosolv lignins from wheat straw," Industrial Crops and Products 23 (2006) 180-193.*
Sidiras, D., et al., "Simulation of acid-catalysed organosolv fractionation of wheat straw," Bioresource Technology 94 (2004) 91-98.*
Kurabi, A., et al. "Enzymatic Hydrolysis of Steam-Exploded and Ethanol Organosolv-Pretreated Douglas-Fir by Novel and Commercial Fungal Cellulases," App. Biochem. Biotech., vol. 121-124, 2005, 219-230.*
International Search Report and Written Opinion of International Application No. PCT/CA2012/000265 dated Jul. 10, 2012.
Pye, E. Kendall et al. "The Alcell™ process A proven alternative to kraft pulping", Tappi Journal, Mar. 1991, pp. 113-117.

(Continued)

*Primary Examiner* — Nicholas Hill
(74) *Attorney, Agent, or Firm* — Perkins Coie LLP; Viola T. Kung

(57) ABSTRACT

The present disclosure relates, at least in part, to compositions comprising lignocellulosic biomass and an organic solvent wherein the lignocellulosic biomass comprises 35% or greater of lignin material. The present disclosure relates, at least in part, to compositions comprising lignocellulosic biomass and an organic solvent wherein the lignocellulosic biomass comprises 50% or less of carbohydrate. In certain embodiments the present compositions may have a viscosity of 5000 cps or less.

17 Claims, No Drawings

(56) References Cited

U.S. PATENT DOCUMENTS

| | | | |
|---|---|---|---|
| 6,464,827 | B1 | 10/2002 | Colodette |
| 6,555,350 | B2 | 4/2003 | Ahring et al. |
| 6,632,286 | B2 | 10/2003 | Converse |
| 7,189,306 | B2 | 3/2007 | Gervais |
| 7,413,662 | B2 | 8/2008 | Eriksen et al. |
| 7,413,882 | B2 | 8/2008 | Berka et al. |
| 7,465,791 | B1 | 12/2008 | Hallberg et al. |
| 7,649,086 | B2 | 1/2010 | Belanger et al. |
| 7,947,182 | B2 | 5/2011 | Gong |
| 7,959,765 | B2 | 6/2011 | Argyropoulos |
| 8,067,193 | B2 | 11/2011 | Hughes et al. |
| 8,193,324 | B2 | 6/2012 | Hallberg et al. |
| 8,227,004 | B2 | 7/2012 | Hallberg et al. |
| 8,288,460 | B2 | 10/2012 | Balakshin et al. |
| 8,378,020 | B1 | 2/2013 | Balakshin et al. |
| 8,399,688 | B2 | 3/2013 | Dumesic et al. |
| 8,426,502 | B2 | 4/2013 | Balakshin et al. |
| 8,431,635 | B2 | 4/2013 | Balakshin et al. |
| 8,445,562 | B2 | 5/2013 | Balakshin et al. |
| 2002/0069987 | A1 | 6/2002 | Pye |
| 2002/0143085 | A1 | 10/2002 | Yoshida et al. |
| 2003/0070995 | A1 | 4/2003 | Breitenbeck |
| 2005/0234156 | A1 | 10/2005 | Thames et al. |
| 2006/0264519 | A1 | 11/2006 | Eckert et al. |
| 2007/0034345 | A1 | 2/2007 | Petrus et al. |
| 2007/0141691 | A1 | 6/2007 | Hiri |
| 2007/0172913 | A1 | 7/2007 | Hughes et al. |
| 2007/0259412 | A1 | 11/2007 | Belanger |
| 2008/0021155 | A1 | 1/2008 | Bono et al. |
| 2008/0115415 | A1 | 5/2008 | Agrawal et al. |
| 2008/0262182 | A1 | 10/2008 | Funaoka |
| 2008/0295980 | A1 | 12/2008 | Hallberg et al. |
| 2008/0299629 | A1 | 12/2008 | Hallberg et al. |
| 2008/0317661 | A1 | 12/2008 | Eckert et al. |
| 2009/0062516 | A1 | 3/2009 | Belanger et al. |
| 2009/0062581 | A1 | 3/2009 | Appel et al. |
| 2009/0069550 | A1 | 3/2009 | Belanger et al. |
| 2009/0117226 | A1 | 5/2009 | Hallberg et al. |
| 2009/0118477 | A1 | 5/2009 | Hallberg et al. |
| 2010/0051558 | A1 | 3/2010 | Gong |
| 2010/0159517 | A1 | 6/2010 | Diner et al. |
| 2010/0305242 | A1 | 12/2010 | Balakshin et al. |
| 2010/0305243 | A1 | 12/2010 | Balakshin et al. |
| 2010/0305244 | A1 | 12/2010 | Balakshin et al. |
| 2010/0311943 | A1 | 12/2010 | Lallave Rivas et al. |
| 2011/0091711 | A1 | 4/2011 | Neivandt et al. |
| 2011/0236946 | A1 | 9/2011 | Maclachlan et al. |
| 2011/0252701 | A1 | 10/2011 | Soane et al. |
| 2012/0136097 | A1 | 5/2012 | Berlin |
| 2012/0237980 | A1 | 9/2012 | Hallberg et al. |
| 2012/0247617 | A1 | 10/2012 | Berlin et al. |
| 2013/0168323 | A1 | 7/2013 | Soane et al. |
| 2013/0204039 | A1 | 8/2013 | Runge |
| 2013/0228298 | A1 | 9/2013 | Balakshin et al. |
| 2014/0346395 | A1 | 11/2014 | Balakshin et al. |

FOREIGN PATENT DOCUMENTS

| | | | | |
|---|---|---|---|---|
| CA | 1230592 | A | 12/1987 | |
| CA | 1278294 | C | 12/1990 | |
| CA | 2043399 | C | 11/1991 | |
| CA | 2214013 | C | 7/1997 | |
| CA | 1339664 | C | 2/1998 | |
| CA | 2419658 | A1 | 3/2002 | |
| CA | 2611152 | A1 | 12/2006 | |
| CA | 2661202 | A1 | 3/2008 | |
| CA | 2676982 | A1 | 8/2008 | |
| CA | 2597135 | C | 9/2008 | |
| CA | 2687916 | A1 | 12/2008 | |
| CA | 2696268 | A1 | 2/2009 | |
| CA | 2697469 | A1 | 3/2009 | |
| CA | 2743052 | A1 | 6/2010 | |
| CA | 2715458 | A1 | 10/2010 | |
| CA | 2798268 | C | 8/2011 | |
| CA | 2803177 | A1 | 1/2012 | |
| CA | WO 2012031356 | A2 * | 3/2012 | C08H 6/00 |
| CN | 1766000 | A | 5/2006 | |
| DE | 199 52 563 | A1 | 5/2001 | |
| DE | 20 2008 001 703 | U1 | 5/2008 | |
| EP | 0038677 | B1 | 7/1984 | |
| EP | 0224721 | A1 | 6/1987 | |
| EP | 0105937 | B1 | 11/1987 | |
| EP | 0461463 | A2 | 12/1991 | |
| EP | 0485150 | A1 | 5/1992 | |
| EP | 0737253 | A1 | 10/1996 | |
| GB | 2439135 | A | 12/2007 | |
| JP | 2007284337 | A | 11/2007 | |
| JP | 2008005832 | A | 1/2008 | |
| SE | 527646 | C2 | 5/2006 | |
| WO | 9315261 | A1 | 8/1993 | |
| WO | 0075153 | A1 | 12/2000 | |
| WO | 2007/129921 | A1 | 11/2007 | |
| WO | 2008008793 | A1 | 1/2008 | |
| WO | WO 2008137639 | A1 * | 11/2008 | A23K 1/146 |
| WO | 2008144878 | A1 | 12/2008 | |
| WO | 2008144903 | A1 | 12/2008 | |
| WO | 2009/003292 | A1 | 1/2009 | |
| WO | 2009/028969 | A1 | 3/2009 | |
| WO | 2010060183 | A1 | 6/2010 | |
| WO | 2010081231 | A1 | 7/2010 | |
| WO | 2010135804 | A1 | 12/2010 | |
| WO | 2010135805 | A1 | 12/2010 | |
| WO | 2010135806 | A1 | 12/2010 | |
| WO | 2010135807 | A1 | 12/2010 | |
| WO | 2010135832 | A1 | 12/2010 | |
| WO | 2010135833 | A1 | 12/2010 | |
| WO | 2011026243 | A1 | 3/2011 | |
| WO | WO 2011028554 | A1 * | 3/2011 | D21C 1/00 |
| WO | 2011097719 | A1 | 8/2011 | |
| WO | 2011097720 | A1 | 8/2011 | |
| WO | 2011097721 | A1 | 8/2011 | |
| WO | 2011106879 | A1 | 9/2011 | |
| WO | 2011/150504 | A1 | 12/2011 | |
| WO | 2012000093 | A1 | 1/2012 | |
| WO | 2012037668 | A1 | 3/2012 | |
| WO | 2012126099 | A1 | 9/2012 | |
| WO | 2012129652 | A1 | 10/2012 | |
| WO | 2014094104 | A1 | 6/2014 | |

OTHER PUBLICATIONS

Zhang, Yi-Heng et al. "Fractionating Recalcitrant Lignocellulose at Modest Reaction Conditions", Biotechnology and Bioengineering, vol. 97, No. 2, Jun. 1, 2007, pp. 214-223.

Wu, et al.; "Development of Lignin/Polyolefin Composites"; China Plastics Industry; vol. 37, No. 6, pp. 1-5 (Jun. 20, 2009). cited by applicant. (English Abstract).

Wu, S. et al., "An Improved Method for Isolating Lignin in High Yield and Purity," Journal of Pulp and Paper Science Jul. 2003, vol. 29, No. 7, pp. 235-240.

Xia et al.: "Quantitative 13C NMR Analysis of Lignins with Internal Standards". J. Agric. Food Chem. 2001, 49, 3573-3378.

Xu et al., "Catalytic Liquefaction of Hydrolytic Lignin in Supercritical Ethanol Solution (II): Effect of Reaction Time, Ratio of Solvent/HL & Atmosphere on Reaction", ACTA Energiae Solaris Sinica, 28(7), p. 805-809—English Translation.

Akim et al.:"13C NMR of Lignins in Aqueous Alkali II. Ionization Effects on the Spectra of Technical Lignins", Holzforschung, 51 (1997) 419-427.

Alfani F et al: "Comparison of SHF and SSF processes for the bioconversion of steam-exploded wheat straw", Journal of Industrial Microbiology and Biotechnology, vol. 25, No. 4, Oct. 2000 (Oct. 2000), pp. 184-192, XP002676900.

Arato C. et al. The Lignol approach to biorefining of woody biomass to produce ethanol and chemicals. Applied Biochemistry and Biotechnology—Part A Enzyme Engineering and Biotechnology Mar. 2005 (Mar. 2005), vol. 123 (1-3), pp. 871-882, ISSN: 0273-2289.

Argyropoulos, DS et al. "Isolation of Residual Kraft Lignin in High Yield and Purity" Journal of Pulp and Paper Science 2002, 28, 2, 50-54.

(56) References Cited

OTHER PUBLICATIONS

Arlt Jr., HG et al., "Lignin Structure. VIII. Characterization of Ethanol Spruce Lignin Prepared by a New Method"; J. Am. Chem. Soc.; vol. 78, No. 9, pp. 1904-1906 (1956).

Asgari, F et al. "Fundamentals of oxygen delignification. Part II. Functional group formation/elimination in residual kraft lignin" Can. J. Chem. 1998, 76, 1606-1615.

Baugh et al. Thermochemical Pretreatment of Lignocellulose to Enhance Methane Fermentation: II. Evaluation and Application of Pretreatment Model, Biotechnology and Bioengineering, vol. 31, pp. 62-70, 1988.

Brosse, N et al. "Dilute Sulphuric acid and ethanol Organosolv Pretreatment of Miscanthus x Gigan-teus" Celluose Chemistry and Technology 2010, 44, 71-78.

Brosse, N et al. "Pretreatment of Miscanthus x giganteus Using the Ethanol Organolsolv Process for Ethanol Production". hid. Eng. Chem. Res. 2009, 8328-8334.

Cateto et al. "Lignins as Macromonomers for Polyurethane Synthesis: A Comparative Study on Hydroxyl Group Determination," Journal of Applied Polymer Science, vol. 109, 3008-3017 (2008).

Catignani, GL et al. "Antioxidant Properties of Lignin" Journal of Food Science 1982, 1745 and 1748.

Chakar, F.S. et al., "Biobleaching chemistry of laccase-mediator systems on high-lignin-content kraft pulps," Can. J. Chem. 2004, 82, pp. 344-352.

Chakar, FS et al. "Laccase-Lignin Reactions" IPST Technical Paper Series No. 876, Institute of Paper Science and Technology Aug. 2000.

Chandel, et al. "Bioconversion of pentose sugars into ethanol: A review and future directions "Biotechnology and Molecular Biology Review vol. 6(1), pp. 008-020, Jan. 2011.

Colodette et al. "Influence of pulping conditions on eucalyptus kraft pulp yield, quality and bleachability". Tappi Journal 2002, (1), 14-20.

Crestini et al.: "Structural Analysis of Wheat Straw Lignin by Quantitative 31 P and 2D NMR Spectroscopy. The Occurrence of Ester Bonds and a-O-4 Substructures". J. Agric. Food. Chem. 1997, 45, 1212-1219.

Datar, Rohit, et al. "Hydrogen Production from the Fermentation of Corn Stover Biomass Pretreated with a SteamExplosion Process," International Journal of Hydrogen Energy, vol. 32, Nov. 13, 2006, pp. 932-939, XP022094535.

Dizhbite, T. et al., "Characterization of the radical scavenging activity of lignins—natural antioxidants," Bioresource Technology 2004, 95, pp. 309-317.

Dominguez, et al.; "Thermal Stability and Pyrolysis Kinetics of Organosolv Lignins Obtained from Eucalyptus Globulus"; Industrial Crops and Products; vol. 27, No. 2, pp. 150-156 (Dec. 21, 2007).

Dr. W. Smith, "Mapping the Development of UK Biorefinery Complexes (NFC07/008)" A Report Prepared for , Tamutech Consultancy, May 2007, 80 pages.

El Hage, R et al. "Characterization of milled wood lignin and ethanol organosolv lignin from miscan-thus". Polymer Degradation and Stability 2009, 94, 1632-1638.

El Hage, R et al. "Effect of the Pre-Treatment Severity on the Antioxidant Properties of Ethanol Organosolv Miscanthus x giganteus Lignin". Natural Resources 2012 (on-line Jun. 2012), 3, 29-34.

El Hage, R et al. "Effects of process severity on the chemical structure of Miscanthus Ethanol organosolv lignin". Polymer Degradation and Stability 2010, 95, 997-1003.

Enoki, A. et al. "Degredation of the Lignin Model Compounds 4-Ethoxy-3Methoxyphenylglycol 3-Guaiacyl and Vanillic Acid Ethers by Phanerochaete Chrysosporium", FEMS Microbiology Letters 10, 1981, p. 373.

Froass, P.M. et al., "Nuclear Magnetic Resonance Studies. 4. Analysis of Residual Lignin after Kraft Pulping," Ind. Eng. Chem. Res. 1998, 37, pp. 3388-3394.

Gellerstedt. G. et al., "Chemical Structures Present in Biofuel Obtained from Lignin," Energy & Fuels 2008, 22, pp. 4240-4244.

Ghatak et al: "Spectroscopic comparison of lignin separated by electrolysis and acid precipitation of wheat straw soda black liquor", Industrial Crops and Products, Elsevier, NL, vol. 28, No. 2, Sep. 1, 2008 (Sep. 1, 2008), pp. 206-212, XP023178276.

Girisuta B. et al. A Kinetic Study on the Conversion of Glucose to Levulinic Acid. Icheme Part A 84(A5)339-349, May 2006.

Girisuta B. Levulinic Acid from Lignocellulosic Biomass. Dissertation Aug. 15, 1975, University of Groningen.

Gosselink et al.: "Analytical protocols for characterization of sulphur-free lignin". Industrial crops and Products 2004, 19, 271-281.

Gosselink, RJA. "Lignin as a reneweable aromatic resource for the chemical industry" Thesis lbr the degree of doctor at Wageningen University. Dec. 2011, 1-191.

Gregorova, A. et al. "Radical Scavenging Capacity of Lignin and Its Effect on Processing Stabilization of Virgin and Recycled Polypropylene", Journal of Applied Polymer Science, 2007, vol. 106, Issue 3, pp. 1626-1631. (V82790US).

Gregorova, A. et al., "Stabilization effect of lignin in polypropylene and recycled polypropylene," Polymer Degradation and Stability 2005, 89, pp. 553-558.

Hahn-Hagerdal et al., "Ethanolic Fermentation of Pentoses in Lignocellulose Hydrolysates, Applied BIochemistry and Biotechnology", vol. 28/29, 1991, 131-144.

Hu, Get al. "Structural Characterization of Switchgrass Lignin atter Ethanol Organosolv Pre-treatment". Energy Fuels 2012 (published Dec. 22, 2011) 26, 740-745.

Hussein, et al; "Oil Spill Sorption using Carbonized Pith Bagasse: Trial for Practical Application"; Int. J. Environ. Tech.; vol. 5, No. 2, pp. 233-242 (Mar. 10, 2008).

Jaaskelainen et al. "The effect of isolation method on the chemical structure of residual lignin". Wood Sci Techno 2003, 37, 91-102.

Jahan, MS et al. "Isolation and Characterization of Lignin from Tropical and Temperate Hardwood" Bangladesh J. Sci. Ind. Res. 2009, 44(3), 271-280.

Jeffries, "Comparison of Alternatives for the Fermentation of Pentoses to Ethanol by Yeasts" In: Lowenstein, M ichael Z., ed. Energy applications of biomass: Proceedings of the National Meeting on Biomass R & D for Energy Applications; Oct. 1-3, 1984; Arlington, VA. New York, NY: Elsevier Applied Science Publishers; 1985 : 231-252.

Kadla, J. F., et al., "Lignin-based carbon fibers for composite fiber applications," Carbon, 2002, 40, 2913-2920.

Kasprzycka-Guttman, T., et al., "Antioxidant properties of lignin and its fractions," Thermochimica Acta 1994, 231, pp. 161-168.

Katzen, R., "Extraction of Lignin from Hydrolyzed Lignocellulose," Ind. Engg. Chem., Dec. 1945, pp. 1218-1222.

Keating Jeffrey D et al: "Tolerance and adaptation of ethanologenic yeasts to lignocellulosic inhibitory compounds", Biotechnology and Bioengineering, vol. 93, No. 6, Apr. 2006 (Apr. 2006), pp. 1196-1206, XP002676901, ISSN: 0006-3592.

Keating, J. D., et al. "An Ethanologenic Yeast Exhibiting Unusual Metabolism in the Fermentation of Lignocellulosic Hexose Sugars", Journal of Industrial Microbiology and Biotechnology, 2004, 31, 235-244.

Kim et al. "Simultaneous consumption of pentose and hexose sugars: an optimal microbial phenotype for efficient fermentation of lignocellulosic biomass" Appl Microbiol Biotechnol (2010) 88:1077-1085.

Kim et al.; "Preliminary Study on Converting Hybrid Poplar to High-Value Chemicals and Lignin Using Organosolv Ethanol Process", Ind. Eng. Chem. Res., Oct. 26, 2010, vol. 49, pp. 12156-12163.

Knutsen, J. and Davis, R.: "Cellulase retention and sugar removal by membrane ul-trafiltration during lignocellulosic biomass hydrolysis", Applied Biochemistry and Biotechnology, 2004, vol. 113-116, pp. 585-599, ISSN: 0273-2289.

Kosa et al. "Characterization of LignoBoost lignin to predict possible utilization". Presentation, Jul. 17, 2009 http/Avww.ipst. gatech.edu/faculty new/facultybios/ragauskas/student presentations/Kosa%20Lignin-SCO.pdf.

(56) References Cited

OTHER PUBLICATIONS

Kosikova, B. et al., "Lignin-Stimuiated Protection of Polypropylene Films and DNA in Cells of Mice against Oxidation Damage," BioResources May 2009, 4(2), pp. 805-815.
Kubo, et al.; "Lignin-Based Carbon Fibers: Effect of Synthetic Polymer Blending of Fiber Properties"; Journal of Polymers and the Environment; vol. 13, No. 2, 97-105 (Apr. 1, 2005).
Kubo, S. et al., "Hydrogen Bonding in Lignin: A Fourier Transform Infrared Model Compound Study," Biomacromolecules 2005, 6, pp. 2815-2821.
Kubo, S. et al., "Kraft Lignin/Poly (ethylene oxide) Blends: Effect of Lignin Structure on Miscibility and Hydrogen Bonding," Journal of Applied Polymer Science 2005, 98, pp. 1437-1444.
Kubo, S. et al., "Poly (Ethylene Oxide)/ Organosolv Lignin Blends: Relationship between Thermal properties, Chemical Structure, and Blend Behaviour"; Macromolecules; vol. 37, pp. 6904-6911 (2004).
Kues et al. (Ed.), "Wood Production, Wood Technology and Biotechnological Impacts", Jan. 1, 2007 (Jan. 1, 2007), , Gottingen : Univ.-Verl. Gottingen, 2007, DE, p. 448.
Liu, H. et al.: "Study on preparation and application in flocculants of modified lignin", Modern Applied Science, Feb. 2011 (Feb. 2011) vol. 5, No. 1, pp. 205-208, 1SSN:1913-1844.
Lucia, LA et al. "Comparative Evaluation of Oxygen Delignification Processes for Low- and High-Lignin-Content Softwood Kraft Pulps" Ind. Eng. Chem. Res. 2002, 41, 5171-5180.
Luo, C., et al., "Identification of potential fermentation inhibitors in conversion of hybrid poplar hydrolyzate to ethanol," Biomass and Bioenergy, 2002, 22, 125-138.
Luo; "Lignin-Based Cargon Fiber—Thesis"; University of Maine (May 2010).
Mabee WE et al. Updates on softwood-to-ethanol process development. Applied Biochemistry and Biotechnology Mar. 2006 (Mar. 2006), vol. 129(1-3), pp. 55-70, ISSN: 0273-2289.
Mansson, P. "Quantitative Determination of Phenolic and Total Hydroxyl Groups in Lignin," Holzforschung, 1983, 37, 143-146.
Marchessault, R.H., "Chemrawn Again!," Cellulose, vol. 14, Aug. 2007, pp. 281-282, XP019524885.
Megiatto, J.D. et al., "Sisal Fibers: Surface Chemical Modification Using Reagent Obtained from a Renewable Source; Characterization of Hemicellulose and Lignin as Model Study," J. Agric. Food Chem. 2007, 55, pp. 8576-8584.
Meier et al. On Properties and Degradability of Lignins, Isolated with Alcohol-Water Mixtures. Holzforschung vol. 35 (1981), Part 5, p. 247-252.
Nada A M A et al: "Infrared spectroscopic characteristics of bagasse cresol lignin", Polymer Degradation and Stability, Barking, GB, vol. 43, No. 1, Jan. 1, 1994 (Jan. 1, 1994), pp. 55-59, XP024144586.
Nenkova, et al.; "Study of the Sorption Properties of Technical Hydrolysis Lignin and Wool Shoddy Towards Oil Pollution"; Journal of the University of Chemical Technology and Metallurgy; vol. 43, No. 2, pp. 217-222 (2008).
Nieminen, et al.; "Determination of Hydroxyl Groups in Kraft Pine Lignin by Silicon-29 NMR Spectroscopy"; Holzforschung: International Journal of the Biology, Chemistry, Physics and Technology of Wood; vol. 43, No. 5, pp. 303-307 (Jan. 1, 1989).
Olempska-Beer, Z.: "Alpha-amylase from Bacillus licheniformis containing a genetical-ly engineered alpha-amylase gene from B. licheniformis (thermostable)", 61st JECFA—Chemical and Technical Assessments of Food Additives (CTA), 2004, pp. 1(6)-6(6).
Olson et al.: "Levulinate Esters from Biomass Wastes"; ACS Symposium Series, 2001, vol. 784, Chapter 5, pp. 51-63.
Palmqvist E et al: "Fermentation of Lignocellulosic Hydrolysates I: Inhibition and Detoxification", Bioresource Technology, Elsevier BV, GB, vol. 74, No. 1, Jan. 1, 2000 (Jan. 1, 2000), pp. 17-24, XP001016127.
Pan X. et al. Biorefining of softwoods using ethanol organosolv pulping: preliminary evaluation of process streams for manufacture of fuel grade ethanol and co-products. Biotechnology and Bioengineering May 20, 2005 (20-4)May 2005), vol. 90(4), pp. 473-481, ISSN: 1097-0290.
Pan, X et al. "Organosolv Ethanol Lignin from Hybrid Poplar as a Radial Scavenger: Relationship be-tween Lignin Structure, Extraction Conditions, and Antioxidant Activity". J. Agric. Food Chem 2006, 54, 5806-5813.
Pan, X et al. "The Bioconversion of Mountain Pine Beetle-Killed Lodgepole Pine to Fuel Ethanol Using the Organolsolv Process". Biotechnology and Bioengineering 2008, 101(1). 39-48.
Pan, X.P. et al., "Bioconversion of Hybrid Poplar to Ethanol and Co-Products Using an Organosolv Fractionation Process: Optimization of Process Yields", Biotechnology and Bioengineering, vol. 94, No. 5, pp. 851-861, Aug. 5, 2006 (Aug. 5, 2006), Published online Mar. 7, 2006 (Mar. 7, 2006) in Wiley InterScience (www.interscience.wiley.com).
Pan, X.P. et al., "Pretreatment of Lodgepole Pine Killed by Mountain Pine Beetle Us-ing the Organosolv Process: Fractionation and Process Optimization", Ind. Eng. Chem. Res. 2007, 46, pp. 2609-2617, Published on Web Mar. 14, 2007 (Mar. 14, 2007).
Pasquini D et al: "Extraction of lignin from sugar cane bagasse and *Pinus taeda* wood chips using ethanol- water mixtures and carbon dioxide at high pressures", Journal of Supercritical Fluids, PRA Press, US, vol. 36, No. 1, Nov. 1, 2005 (Nov. 1, 2005), pp. 31-39, XP027818818, ISSN: 0896-8446.
Pu, Y. et al., "Investigation of the photo-oxidative chemistry of acetylated softwood lignin," Journal of Photochemistry and Photobiology: A Chemistry 163, 2004, pp. 215-221.
Pu, Y. Y et al., "Structural analysis of acetylated hardwood lignins and their photoyellowing properties," Can. J. Chem. 2005, 83, pp. 2132-2139.
Ruiz-Rosas, et al.; "The Production of Submicron Diameter Carbon Fibers by the Electrospinning of Lignin"; Carbon, Elsevier, Oxford, GB; vol. 48, No. 3, pp. 696-705 (Mar. 1, 2010).
Said, et al.; "Usefulness of Raw Bagasse for Oil Absorption: A Comparison of Raw and Acylated Bagasses and their Components"; Bioresource Technology 100; pp. 2219-2222 (2009).
Sannigrahi, P et al. "Lignin Structural Modifications Resulting from Ethanol Organosolv Treatment of Lob-lolly Pine", Energy Fuels 2010, 24. 683-689.
Sayed, et al.; "Oil Spill Pollution Treatment by Sorption on Natural *Cynanchum Acutum* L. Plant"; Journal of Applied Sciences & Environmental Management; vol. 7, No. 2, pp. 63-73 (Dec. 2003).
Sealey, J et al., "Residual Lignin Studies of Laccase Delignified Kraft Pulps," IPST Technical Paper Series, No. 621, Institute of Paper Science and Technology, Aug. 1996, 7 pages.
Shu-Bin Wu et al: "Chemical structures and thermochemical properties of bagasse lignin", Forestry Studies in China, Beijing Forestry University, BE, vol. 8, No. 3, Sep. 1, 2006 (Sep. 1, 2006), pp. 34-37, XP019440259.
Sun, X.-F., et al., "Extraction and characterization of original lignin and hemicelluloses from wheat straw," J. Agric. Food Chem., 2005, 53, 860-870.
Sun, et al.; "Acetylation of Rice Straw with or without Catalysts and its Characterization as a Natural Sorbent in Oil Spill Cleanup"; Journal of Agricultural and Food Chemistry; vol. 50, No. 22, pp. 6428-6433 (Oct. 1, 2002).
Taherzadeh, Mohammad J., et al. "Enzyme-Based Hydrolysis Processes for Ethanol from Lignocellulosic Materials: A Review," Bioresources, vol. 2, Nov. 2007, pp. 707-738, XP008130300.
Tai, D., et al. "Biodegradation of guaiacyl and guaiacyl-syringyl lignins in wood by Phanerochaete chrysosporium." Recent advances in lignin biodeterioration: proceedings of an international seminar, organized under the auspices of the US-Japan cooperative science programm. Uni Publishers Co. Ltd. Uni Publishers, 1983.
Tanaka, M. et al.: "Removal of lignin and reuse of cellulases for continuous saccharification of lignocelluloses", Biotechnology and Bioengineering, Sep. 20, 1988 (Sep. 20, 1988) vol. 32, No. 7, pp. 897-902, ISSN: 0006-3592.
Tejado et al., "Isocyanate curing of novolac-type ligon-phenol-formaldehyde resins", Industrial Crops and Products, vol. 27, No. 2, pp. 208-213, Dec. 21, 2007.
Tejado, A et al. "Physico-chemical characterization of lignins from different sources for use in phe-nol-formaldehyde resin synthesis" Bioresource Technology 2007, 98, 1655-1663.

(56) References Cited

OTHER PUBLICATIONS

Tohmura, Shin-ichiro et al., "Determination of Arylglycerol-fi—aryl Ethers and Other Linkages in Lignins Using DFRC/31 P NMR," J. Agric. Food Chem. 2001, 49, pp. 536-542.

Tolbert, A. et al. "Characterization and Analysis of the Molecular Weight of Lignin for Biorefining Studies," Biofuels, Bioprod. Bioref., 2014, Review, 21 pages.

Van Maris, Antonius J A, et al.: "Alcoholic fermentation of carbon sources in biomass hydrolysates by *Saccharomyces cerevisiae:* current status", Antonie Van Leeuwenhoek, Kluwer Academic Publishers, DO, vol. 90, No. 4, Oct. 11, 2006 (Oct. 11, 2006), pp. 391-418, XP019446684.

Vinardell, M.P. et al., "Potential applications of antioxidant lignins from different sources," Industrial Crops and Products 2008, pp. 220-223.

Vinardell; "Application of Lignins from Different Sources as Antioxidant"; Detergent & Cosmetics; vol. 31, No. 9, pp. 28-30 (Sep. 25, 2008). (English Abstract).

Wang, Y. et al.: "Application of a novel cationic polyacrylamide as flocculant in treat-ment of papermaking wastewater", Jun. 2010 (Jun. 2010) Bioinformatics and Bio-Medical Engineering, 2010 4th International Conference, pp. 1-4, ISSN: 2151-7614.

Xue, B-L et al. "Polyols Production by Chemical Modification of Autocatalyzed Ethanol-Water lignin from Betula Alnoides". Paper PS-79. Proceedings of the 55th International Convention of Society of IVood Science and Technology Aug. 27-31, 2012, Beijing, China.

Yang, R. et al., "Oxygen Degradation and Spectroscopic Characterization of Hardwood Lignin," Ind. Eng. Chem. Res. 2002, 41, pp. 5941-5948.

Zawadzki, M. et al., "N-Hydroxy Compounds as New Internal Standards for the 31P-NMR Determination of Lignin Hydroxy Functional Groups," Holzforschung 2001, 55, 3, pp. 283-285.

Zhang et al. "Removal of Residual Lignin of Ethanol-Based Organosolv Pulp by an Alkalu Extraction Process," J. Applied Polymer Science, 2007, vol. 106, pp. 630.

Zhou Xue-fei "AS-AQ Pulping of Eucalyptus Wood and the Structural Change of Lignin During Pulping". Chemistry and Industry of Forest Products 2004, 24, 107-110 (English Abstract).

"Cincalehah", Database Traditional Knowledge Digital Library, Database accession No. SJ/1103, Rasayoga Sagara—Compiled and Translated by Vaidya Pandita Hariprapanna Ji ,vol.-I : Krishnadas Academy, Varanasi, Edn. Reprint, 1999. p. 442-443.

"Baloot", Database Traditional Knowledge Digital Library, Database accession No. AN4/83, Ali Ibn-e-Abbaas Majoosi; Kaamil-al-Sena'ah, Part I (10th century AD), Central Council for Research in Unani Medicine, 61-65 Institutional Area, Janak Puri, New Delhi-58, 2005 AD p. 190.

"Khadiraniryasa Rasa Prayoga", Database Traditional Knowledge Digital Library, Digital Library Database accession No. RG1/1500, Cakraparlidattah; Cakradattah—Translated by Indradeva Tripathi; Chaukhamba Sanskrit Samsthan (Varanasi), Ed. 4th 2002. p. 285.

"Velli Parpam", Database Traditional Knowledge Digital Library, Database accession No. GP01/265, Therayar; Therayar Sekarappa Publisher: C.C.R.A.S, New Delhi.(Edn: 1st, 1979). p. 200-202.

"Majoon-E-Moosli Paak", Database Traditional Knowledge Digital Library, Database accession No. MA3/629, Mohammad Kabiruddin; Bayaaz-e-Kabir, vol. II (Compiled), Daftar-al-Maseeh, Karol Bagh, New Delhi, 1938 AD p. 173-174.

"Sanoobar", Database Traditional Knowledge Digital Library, Database accession No. AA21/87E, Abu Bakr Mohammad.Bin Zakariyya Al-Razi; Kitaab-al-Haawi-fil-Tibb, vol. XXI Part I ($9^{th}$ century AD), Dayerah-al-Ma'aarif Usmania, Hyderabad, (First Edition) 1968 AD p. 128.

"Vasantakusumakararasa", Database Traditional Knowledge Digital Library, Data-base accession No. AK9/717, Cuadmarii; Rasakamadhenu Sarhhita—Edited by Jivaramakalidasa Sastri, Part 4, Chaukhambha Publishers, Varanasi, Edn. 1st 1992 p. 235.

"Rasayanaristah", Database Traditional Knowledge Digital Library, Database accession No. RS/992, Sodhala; Gadanigrahah ed,Ganga Sahaya Pandeya & Corn.-Indradeva Tripathi,Part-I(Prayoga 2 Khanda) Chaukhamba Sanskrit Sansthan, Varanasi, Ed. 3rd 1999 p. 392.

"Baladi Ausadh", Database Traditional Knowledge Digital Library, Database accession No. AJ/697, Harita; Harita Samhita—Translated by Hariharaprasada Tripathi, Chaukhambha Krishnadas Academy (Varanasi), Ed. 1st 2005 p. 352-353.

\* cited by examiner

COMPOSITIONS COMPRISING LIGNOCELLULOSIC BIOMASS AND ORGANIC SOLVENT

This application is a continuation of PCT/CA2012/000265, filed Mar. 23, 2012; which claims the priority of U.S. Provisional Application No. 61/467,319, filed Mar. 24, 2011. The contents of the above-identified applications are incorporated herein by reference in their entireties.

FIELD

This disclosure relates, at least in part, to compositions comprising lignocellulosic biomass and organic solvent. The disclosure further relates to uses, apparatus, methods, and the like.

BACKGROUND

For environmental, economic, and resource security reasons, there is a desire to obtain energy and material products from bio-renewable resources and particularly from "waste" and/or non-food biomass feedstocks. The various chemical components within typical biomass can be employed in a number of ways. For example, the cellulose and hemicellulose in plant matter may fermented into fuel grade alcohol, synthetic biodiesel, fuel grade butanol, xylitol, succinic acid, and other useful materials. The lignin component from biomass, and other types of extractives, have potential as a useful source of chemicals for certain industrial applications. Extracting these valuable resources from biomass could increase the commercial viability of the various biorefining/pulping processes. However, to date most biomass fractionation techniques employed by industry have been optimized for the production of high-quality fibre rather than the production of lignins and their derivatives. Thus, large-scale commercial application of the extractives, particularly those isolated in traditional pulping processes employed in the manufacture of pulp for paper production, has been limited due to, for example, the inconsistency of their chemical and functional properties. These inconsistencies may, for example, be due to changes in feedstock supplies and the particular extraction, generation, and/or recovery conditions. These issues are exacerbated by the complexity of the molecular structures of the extractives, such as lignin derivatives, produced by the various extraction methods and the difficulty in performing reliable routine analyses of the structural conformity and integrity of recovered extractives. Despite this lignin derivatives obtained via organosolv extraction, such as the Alcell® process (Alcell is a registered trademark of Lignol Innovations Ltd., Burnaby, BC, CA), have been used in rubber products, adhesives, resins, plastics, asphalt, cement, casting resins, agricultural products, oil-field products and as feedstocks for the production of fine chemicals.

Various processes are known for the biorefining of lignocellulosic feedstocks. These include, for example, ammonia pretreatment, dilute acid pretreatment, dilute ammonia pretreatment, concentrated acid hydrolysis, steam explosion, lime treatment, and the like. These treatment processes often produce a carbohydrate-rich stream which is frequently fermented into a biofuel such as biodiesel. These processes usually produce further chemicals such as lignin derivatives at the like. Additionally, these processes can leave a solid or semi-solid lignaceous residue which may comprise lignins, recalcitrant cellulose, and other substances. This material is typically considered 'waste' and may be burnt for its fuel value.

SUMMARY

The present disclosure relates, at least in part, to compositions comprising lignocellulosic biomass and an organic solvent wherein the lignocellulosic biomass comprises 35% or greater of lignin material. The present disclosure relates, at least in part, to compositions comprising lignocellulosic biomass and an organic solvent wherein the lignocellulosic biomass comprises 50% or less of carbohydrate. The present lignocellulosic biomass may comprise 35% or greater of lignin material and 50% or less of carbohydrate.

The present disclosure relates, at least in part, to compositions comprising lignocellulosic biomass and an organic solvent wherein the lignocellulosic biomass comprises 5% or greater recalcitrant cellulose.

In certain embodiments the present compositions may have a viscosity of 5000 cps or less.

The present disclosure relates, at least in part, to methods of processing lignaceus residue. The present disclosure in part provides a process for extracting lignin and/or other derivatives from the lignaceaus residue of a cellulosic bio-ethanol plant. For example, an embodiment of the present disclosure provides for organosolv extraction of lignin derivatives from the lignaceaus residue of a steam explosion-type process. As previously stated the lignaceaus residue has usually been considered of use for its fuel value only. It has been found that this residue may be treated via an organosolv process to produce useful products such as, for example, reactive carbohydrates (which may, for example, be used in the production of ethanol), lignin derivatives, and/or other extractives.

The compositions, methods, processes or systems of present disclosure may improve the economic viability of a biorefinery processes. For example, the compositions, methods, processes or systems of present disclosure may provide additional carbohydrate residue for conversion into biofuel and/or additional extractives. The present compositions comprising lignocellulosic biomass and an organic solvent may be in a 'pumpable' form which is easier to process in a continuous manner.

The present disclosure in part provides compounds extracted from lignaceaus residue.

The present disclosure in part provides uses of compounds that may be extracted from lignaceaus residue.

As used herein, the term "biorefining" refers to the production of carbohydrate and/or other bio-based products (e.g. lignin derivatives) from biomass. The carbohydrate is frequently fermented into biofuel such as ethanol. Examples of biorefining processes include, but are not limited to, ammonia pretreatment, dilute acid pretreatment, dilute ammonia pretreatment, concentrated acid hydrolysis, steam explosion, lime treatment, and the like.

As used herein, the term "lignaceaus residue" refers to the solid or semi-solid material that remains after a lignocellulosic feedstock has been treated in a biorefining process. Such residue generally comprises lignin and/or recalcitrant cellulose. Other materials such as protein and ash may also be present.

The term "recalcitrant cellulose" refers to the relatively unreactive cellulose fraction remaining after a biomass has undergone biorefining. As used herein, "recalcitrant" means cellulose which is hydrolysed to glucose at a rate of less than 10% per day when incubated at 40° C. in the presence of 20 mg cellulase protein per g cellulose substrate.

As used herein, the term "organosolv" refers to a biomass extraction processes wherein the biomass is subject to an extraction step using an organic solvent at an elevated temperature.

As used herein, the term "lignocellulosic biomass" refers to biologically-derived material which when in its natural state comprises cellulose and lignin. The biomass will usually be derived from plants.

As used herein, the term "native lignin" refers to lignin in its natural state, in plant biomass.

As used herein, the terms "lignin derivatives" and "derivatives of native lignin" refer to lignin material including to polymeric and oligomeric compounds extracted from lignocellulosic biomass. Usually, such material will be a mixture of lignin-derived chemical compounds that are generated during the extraction process.

Unless otherwise indicated or implied through their context all percentages herein should be considered percentage by weight.

This summary does not necessarily describe all features of the invention. Other aspects, features and advantages of the invention will be apparent to those of ordinary skill in the art upon review of the following description of specific embodiments of the invention.

DETAILED DESCRIPTION

The present disclosure relates, at least in part, to compositions comprising lignocellulosic biomass and an organic solvent wherein the lignocellulosic biomass comprises 25% or greater of lignin material. For example, about 26% or greater, about 28% or greater, about 30% or greater, about 32% or greater, about 34% or greater, about 35% or greater, about 36% or greater, about 38% or greater, about 40% or greater, about 42% or greater, about 44% or greater, about 46% or greater, about 48% or greater, about 50% or greater, of lignin material. The present disclosure relates, at least in part, to compositions comprising lignocellulosic biomass and an organic solvent wherein the lignocellulosic biomass comprises 50% or less of carbohydrate. For example, about 48% or less, about 46% or less, about 44% or less, about 42% or less, about 40% or less, about 38% or less, about 36% or less, about 34% or less, about 32% or less, about 30% or less, of carbohydrate, The present lignocellulosic biomass may comprise 35% or greater of lignin material and 50% or less of carbohydrate. The present disclosure relates, at least in part, to compositions comprising lignocellulosic biomass and an organic solvent wherein the lignocellulosic biomass comprises about 5% or greater, about 10% or greater, about 15% or greater, about 20% or greater, recalcitrant cellulose.

It is known in the art to add organic solvent to lignocellulosic biomass (see, for example, U.S. Pat. No. 4,100,016; U.S. Pat. No. 4,764,596; U.S. Pat. No. 5,681,427; U.S. Pat. No. 7,465,791; US Patent Application 2009/0118477; US Patent Application 2009/0062516; US Patent Application 2009/00669550; or U.S. Pat. No. 7,649,086). The lignocellulosic biomass in the present compositions comprises a higher lignin content, a lower carbohydrate content, or both, when compared to the lignocellulosic biomass used in these prior art processes. While not wishing to be bound by theory, it is believed that useful products may be extracted from compositions comprising lignocellulosic biomass according to the present disclosure and organic solvent. For example, organic solvent may be added to the lignaceaus residue of a biorefinery, which is typically considered waste, and when subjected to an organosolv treatment, lignin-derived aromatic products may be recovered. Additionally, it is believed that the recalcitrant cellulose contained in the lignaceaus residue may be made more susceptible to further processing.

The present compositions may have a viscosity of 5000 cps or less. Such as, for example, 4500 cps or less, 4000 cps or less, 3500 cps or less, 3000 cps or less, 2500 cps or less, 2000 cps or less, 1500 cps or less, 1000 cps or less, 800 cps or less, 600 cps or less, 400 cps or less, 200 cps or less (viscosity measurements made using viscometer Viscolite 700 (Hydramotion Ltd., Malton, York YO17 6YA England).

The weight ratio of solvent liquor to biomass in the present compositions may be any suitable ratio such as, for example, from about 20:1 to about 2:1, 10:1 to about 3:1, about 9:1 to about 4:1, about 8:1 to about 5:1.

The present compositions may have any suitable pH such as, for example, from about 1.5 or greater, 1.6 or greater, 1.7 or greater. The present composition may have any suitable pH such as, for example, from about 2.5 or lower, 2.4 or lower, 2.3 or lower. For example, the composition may have a pH of from about 1.5 to about 2.5. For example, the pH may be from about 1.6 to about 2.3.

From about 1.5% or greater, 1.7% or greater, 1.9% or greater, 2% or greater, by weight, of acid (based on dry weight of biomass) may be added to the present compositions. From about 3% or lower, 2.7% or lower, 2.5% or lower, by weight, of acid (based on dry weight wood) may be added to the present compositions.

The organic solvent herein may be a mixture comprising, for example, about 40% or more, 42% or more, 44% or more, 46% or more, 48% or more, 50% or more, organic solvent such as ethanol. The solvent herein may comprise about 80% or less, about 75% or less, about 70% or less, 68% or less, 66% or less, 64% or less, 62% or less, 60% or less, 58% or less, 56% or less, organic solvent such as ethanol. For example, the solvent may comprise about 45% to about 60%, about 50% to about 55% organic solvent such as ethanol. The remainder of the solvent may be any suitable substance such as, for example, water.

The present organic solvent may be selected from any suitable solvent. For example, aromatic alcohols such as phenol, catechol, and combinations thereof; short chain primary and secondary alcohols, such as methanol, ethanol, propanol, and combinations thereof. The organic solvent may be ethanol.

Any suitable lignocellulosic biomass may be utilized herein including hardwoods, softwoods, annual fibres, energy crops, municipal waste, and combinations thereof.

Hardwood feedstocks include Acacia; Afzelia; *Synsepalum duloificum*; Albizia; Alder (e.g. *Alnus glutinosa, Alnus rubra*); Applewood; Arbutus; Ash (e.g. *F. nigra, F. quadrangulata, F. excelsior, F. pennsylvanica lanceolata, F. latifolia, F. profunda, F. americana*); Aspen (e.g. *P. grandidentata, P. tremula, P. tremuloides*); Australian Red Cedar (*Toona ciliata*); Ayna (*Distemonanthus benthamianus*); Balsa (*Ochroma pyramidale*); Basswood (e.g. *T. americana, T. heterophylla*); Beech (e.g. *F. sylvatica, F. grandifolia*); Birch; (e.g. *Betula populifolia, B. nigra, B. papyrifera, B. lenta, B. alleghaniensis/B. lutea, B. pendula, B. pubescens*); Blackbean; Blackwood; Bocote; Boxelder; Boxwood; Brazilwood; Bubinga; Buckeye (e.g. *Aesculus hippocastanum, Aesculus glabra, Aesculus flava/Aesculus octandra*); Butternut; Catalpa; Cherry (e.g. *Prunus serotina, Prunus pennsylvanica, Prunus avium*); Crabwood; Chestnut; Coachwood; Cocobolo; Corkwood; Cottonwood (e.g. *Populus balsamifera, Populus deltoides, Populus sargentii, Populus hetero-*

*phylla*); Cucumbertree; Dogwood (e.g. *Cornus florida, Cornus nuttallii*); Ebony (e.g. *Diospyros kurzii, Diospyros melanida, Diospyros crassiflora*); Elm (e.g. *Ulmus americana, Ulmus procera, Ulmus thomasii, Ulmus rubra, Ulmus glabra*); Eucalyptus; Greenheart; Grenadilla; Gum (e.g. *Nyssa sylvatica, Eucalyptus globulus, Liquidambar styraciflua, Nyssa aquatica*); Hickory (e.g. *Carya alba, Carya glabra, Carya ovata, Carya laciniosa*); Hornbeam; Hophombeam; Ipê; Iroko; Ironwood (e.g. Bangkirai, *Carpinus caroliniana, Casuarina equisetifolia, Choricbangarpia subargentea, Copaifera* spp., *Eusideroxylon zwageri, Guajacum officinale, Guajacum sanctum, Hopea odorata*, Ipe, Krugiodendronferreum, *Lyonothamnus lyonii* (*L. floribundus*), *Mesua ferrea, Olea* spp., *Olneya tesota, Ostrya virginiana, Parrotia persica, Tabebuia serratifolia*); Jacarandá; Jotoba; Lacewood; Laurel; Limba; Lignum vitae; Locust (e.g. *Robinia pseudacacia, Gleditsia triacanthos*); Mahogany; Maple (e.g. *Acer saccharum, Acer nigrum, Acer negundo, Acer rubrum, Acer saccharinum, Acer pseudoplatanus*); Meranti; Mpingo; Oak (e.g. *Quercus macrocarpa, Quercus alba, Quercus stellata, Quercus bicolor, Quercus virginiana, Quercus michauxii, Quercus prinus, Quercus muhlenbergii, Quercus chrysolepis, Quercus lyrata, Quercus robur, Quercus petraea, Quercus rubra, Quercus velutina, Quercus laurifolia, Quercus falcata, Quercus nigra, Quercus phellos, Quercus texana*); Obeche; Okoumé; Oregon Myrtle; California Bay Laurel; Pear; Poplar (e.g. *P. balsamifera, P. nigra*, Hybrid Poplar (*Populus×canadensis*)); Ramin; Red cedar; Rosewood; Sal; Sandalwood; Sassafras; Satinwood; Silky Oak; Silver Wattle; Snakewood; Sourwood; Spanish cedar; American sycamore; Teak; Walnut (e.g. *Juglans nigra, Juglans regia*); Willow (e.g. *Salix nigra, Salix alba*); Yellow poplar (*Liriodendron tulipifera*); Bamboo; Palmwood; and combinations/hybrids thereof.

For example, hardwood feedstocks for the present invention may be selected from Acacia, Aspen, Beech, Eucalyptus, Maple, Birch, Gum, Oak, Poplar, and combinations/hybrids thereof. The hardwood feedstocks for the present invention may be selected from *Populus* spp. (e.g. *Populus tremuloides*), *Eucalyptus* spp. (e.g. *Eucalyptus globulus*), *Acacia* spp. (e.g. *Acacia dealbata*), and combinations/hybrids thereof.

Compositions of the present disclosure comprising hardwood biomass may comprise about 26% or greater, about 28% or greater, about 30% or greater, about 32% or greater, about 34% or greater, about 35% or greater, about 36% or greater, lignin material.

Compositions of the present disclosure comprising hardwood biomass may comprise about 50% or less, about 45% or less, about 40% or less, about 38% or less, about 36% or less, about 34% or less, carbohydrate.

Softwood feedstocks include Araucaria (e.g. *A. cunninghamii, A. angustifolia, A. araucana*); softwood Cedar (e.g. *Juniperus virginiana, Thuja plicata, Thuja occidentalis, Chamaecyparis thyoides Callitropsis nootkatensis*); Cypress (e.g. *Chamaecyparis, Cupressus Taxodium, Cupressus arizonica, Taxodium distichum, Chamaecyparis obtusa, Chamaecyparis lawsoniana, Cupressus semperviren*); Rocky Mountain Douglas fir; European Yew; Fir (e.g. *Abies balsamea, Abies alba, Abies procera, Abies amabilis*); Hemlock (e.g. *Tsuga canadensis, Tsuga mertensiana, Tsuga heterophylla*); Kauri; Kaya; Larch (e.g. *Larix decidua, Larix kaempferi, Larix laricina, Larix occidentalis*); Pine (e.g. *Pinus nigra, Pinus banksiana, Pinus contorta, Pinus radiata, Pinus ponderosa, Pinus resinosa, Pinus sylvestris, Pinus strobus, Pinus monticola, Pinus lambertiana, Pinus taeda, Pinus palustris, Pinus rigida, Pinus echinata*); Redwood; Rimu; Spruce (e.g. *Picea abies, Picea mariana, Picea rubens, Picea sitchensis, Picea glauca*); Sugi; and combinations/hybrids thereof.

For example, softwood feedstocks which may be used herein include cedar; fir; pine; spruce; and combinations/hybrids thereof. The softwood feedstocks for the present invention may be selected from loblolly pine (*Pinus taeda*), radiata pine, jack pine, spruce (e.g., white, interior, black), Douglas fir, *Pinus silvestris, Picea abies*, and combinations/hybrids thereof. The softwood feedstocks for the present invention may be selected from pine (e.g. *Pinus radiata, Pinus taeda*); spruce; and combinations/hybrids thereof.

Compositions of the present disclosure comprising softwood biomass may comprise about 35% or greater, about 36% or greater, about 38% or greater, about 40% or greater, about 42% or greater, about 44% or greater, about 46% or greater, lignin material.

Compositions of the present disclosure comprising softwood biomass may comprise about 65% or less, about 60% or less, about 55% or less, about 50% or less, about 48% or less, about 46% or less, carbohydrate.

Annual fibre feedstocks include biomass derived from annual plants, plants which complete their growth in one growing season and therefore must be planted yearly. Examples of annual fibres include: flax, cereal straw (wheat, barley, oats), sugarcane bagasse, rice straw, corn stover, corn cobs, hemp, fruit pulp, alfalfa grass, esparto grass, switchgrass, palm fibre/residue, miscanthus, giant reed, and combinations/hybrids thereof. Industrial residues like corn cobs, fruit peals, seeds, etc. may also be considered annual fibres since they are commonly derived from annual fibre biomass such as edible crops and fruits. For example, the annual fibre feedstock may be selected from wheat straw, corn stover, corn cobs, sugar cane bagasse, and combinations/hybrids thereof.

Compositions of the present disclosure comprising annual fibre biomass may comprise about 30% or greater, about 32% or greater, about 34% or greater, about 35% or greater, about 36% or greater, about 38% or greater, about 40% or greater, lignin material.

Compositions of the present disclosure comprising annual fibre biomass may comprise about 50% or less, about 25% or less, about 24% or less, about 22% or less, about 20% or less, about 18% or less, carbohydrate.

The present disclosure provides in part methods, processes, and systems for the treatment of the lignaceaus residue of a biorefinery process. The present methods, processes, and systems comprise the organosolv treatment of the lignaceaus residue of a biorefinery. For example, the present method, process or system may comprise the organosolv treatment of the lignaceaus residue of a acid hydrolysis-type biorefinery. For example, the present method, process or system may comprise the organosolv treatment of the lignaceaus residue of a biorefinery using a dilute acid pretreatment-type. For example, the present method, process or system may comprise the organosolv treatment of the lignaceaus residue of dilute ammonia pretreatment-type biorefinery. For example, the present method, process or system may comprise the organosolv treatment of the lignaceaus residue of steam explosion-type biorefinery.

In an embodiment the present process comprises:
  a. Obtaining a lignocellulosic material;
  b. Performing a steam-explosion treatment process on the lignocellulosic material to obtain at least a carbohydrate-rich stream and a lignaceaus residue;
  c. Optionally, further processing the carbohydrate-rich stream to generate sugars and/or fermentation products;

d. Separating at least a part of the lignaceaus residue;
e. Mixing at least a portion of the separated lignaceaus residue with an organic solvent to form an extraction mixture;
f. Subjecting the mixture to an elevated temperature and pressure and, optionally, acid;
g. Maintaining the elevated temperature and pressure for a period; and
h. Recovering aromatic compounds from the solvent.

In an embodiment the present process comprises:
a. Obtaining a lignocellulosic material;
b. Performing an concentrated acid-hydrolysis treatment process on the lignocellulosic material to obtain a carbohydrate-rich stream and a lignaceaus residue;
c. Optionally, further processing the carbohydrate stream to generate sugars and/or fermentation products;
d. Separating at least a part of the solid lignaceaus residue;
e. Mixing at least a portion of the lignaceaus residue with an organic solvent to form an extraction mixture;
f. Subjecting the mixture to an elevated temperature and pressure and, optionally, acid;
g. Maintaining the elevated temperature and pressure for a period; and
h. Recovering aromatic compounds from the solvent.

In an embodiment the present process comprises:
a. Obtaining a lignocellulosic material;
b. Performing a dilute acid treatment process on the lignocellulosic material to obtain a carbohydrate-rich stream and a lignaceaus residue;
c. Optionally, further processing the carbohydrate stream to generate sugars and/or fermentation products;
d. Separating at least a part of the solid lignaceaus residue;
e. Mixing at least a portion of the lignaceaus residue with an organic solvent to form an extraction mixture;
f. Subjecting the mixture to an elevated temperature and pressure and, optionally, acid;
g. Maintaining the elevated temperature and pressure for a period; and
h. Recovering aromatic compounds from the solvent.

In an embodiment the present process comprises:
a. Obtaining a lignocellulosic material;
b. Performing a ammonia treatment process on the lignocellulosic material to obtain a carbohydrate stream and a lignaceaus residue;
c. Optionally, further processing the carbohydrate-rich stream to generate sugars and/or fermentation products;
d. Separating at least a part of the solid lignaceaus residue;
e. Mixing at least a portion of the lignaceaus residue with an organic solvent to form an extraction mixture;
f. Subjecting the mixture to an elevated temperature and pressure and, optionally, acid;
g. Maintaining the elevated temperature and pressure for a period; and
h. Recovering aromatic compounds from the solvent.

In an embodiment the present process comprises:
a. Obtaining a lignocellulosic material;
b. Performing a dilute ammonia treatment process on the lignocellulosic material to obtain a carbohydrate stream and a lignaceaus residue;
c. Optionally, further processing the carbohydrate-rich stream to generate sugars and/or fermentation products;
d. Separating at least a part of the solid lignaceaus residue;
e. Mixing at least a portion of the lignaceaus residue with an organic solvent to form an extraction mixture;
f. Subjecting the mixture to an elevated temperature and pressure and, optionally, acid;
g. Maintaining the elevated temperature and pressure for a period; and
h. Recovering aromatic compounds from the solvent.

In an embodiment the present process comprises:
a. Obtaining a lignocellulosic material;
b. Performing a lime treatment process on the lignocellulosic material to obtain a carbohydrate stream and a lignaceaus residue;
c. Optionally, further processing the carbohydrate-rich stream to generate sugars and/or fermentation products;
d. Separating at least a part of the solid lignaceaus residue;
e. Mixing at least a portion of the lignaceaus residue with an organic solvent to form an extraction mixture;
f. Subjecting the mixture to an elevated temperature and pressure and, optionally, acid;
g. Maintaining the elevated temperature and pressure for a period; and
h. Recovering aromatic compounds from the solvent.

The present compositions may be subjected to organosolv processing. Any suitable organosolv processing conditions may be used herein. Various organosolv processes are known in the art. See, for example, U.S. Pat. No. 4,100,016; U.S. Pat. No. 4,764,596; U.S. Pat. No. 5,681,427; U.S. Pat. No. 7,465,791; US Patent Application 2009/0118477; US Patent Application 2009/0062516; US Patent Application 2009/00669550; or U.S. Pat. No. 7,649,086. Four major "organosolv" processes are known. The first method uses ethanol/water pulping (aka the Lignol® (Alcell®) process); the second method uses alkaline sulphite anthraquinone methanol pulping (aka the "ASAM" process); the third process uses methanol pulping followed by methanol, NaOH, and anthraquinone pulping (aka the "Organocell" process); the fourth process uses acetic acid/hydrochloric acid or formic acid pulping (aka the "Acetosolv" and "Formacell" processes). A description of the Lignol® Alcell® process can be found, for example, in U.S. Pat. No. 4,764,596 or Kendall Pye and Jairo H. Lora, The Alcell™ Process, Tappi Journal, March 1991, pp. 113-117. Various disclosures exemplified by U.S. Pat. No. 7,465,791 and PCT Patent Application Publication No. WO 2007/129921, describe modifications to the Lignol® Alcell® organosolv (all references are herein incorporated by reference). The process generally comprises pulping or pre-treating a fibrous biomass feedstock with primarily an ethanol/water solvent solution under conditions that include: (a) 60% ethanol/40% water (w/w), (b) a temperature of about 180° C. to about 210° C., and (c) pressure of about 20 atm to about 35 atm. In the present disclosure these conditions are referred to as "Alcell™ conditions".

While not wishing to be bound by theory it is believed that the present compositions may be suitable for processing at lower temperatures and pressures than typically used in organosolv extraction processes. In addition, it is believed that the required treatment time may be reduced. These factors can enhance the economic viability of the process.

The present organosolv processing may be adapted depending on the desired output. For example, the process may be a "Low Temperature" process. The present compositions may be subjected to pressures of about 18 bar or less. For example, 17 bar or less, 16 bar or less, 15 bar or less. The present compositions may be subjected to a temperature of from about 130° C. or greater, 132° C. or greater, 134° C. or greater, 136° C. or greater, 138° C. or greater, 140° C. or greater, 142° C. or greater, 144° C. or greater, 146° C. or greater, 148° C. or greater, 150° C. or greater, 152° C. or greater, 154° C. or greater. The present compositions herein may be subjected to a temperature of from about 170° C. or less, 168° C. or less, 166° C. or less, 165° C. or less. For example, the present compositions may be subjected to a temperature of from about 155° C. to about 165° C. The present compositions may be subjected to the elevated temperature for about 45 minutes or more, 50 minutes or more, 55 minutes or more, 60 minutes or more, 65 minutes or more, 70 minutes or more, 75 minutes or more, 80 minutes or more, 95 minutes or more, 100 minutes or more, 105 minutes or more, 110 minutes or more, 115 minutes or more, 120 minutes or more. The present compositions may be subjected to the elevated temperature for about 200 minutes or less, 195 minutes or less, 190 minutes or less, 185 minutes or less, 180 minutes or less. For example, the present compositions may be subjected to the elevated temperature for about 120 to about 180 minutes.

The present organosolv processing may be adapted depending on the desired output. The present composition preferably is subjected to pressures of about 1 bar or greater, about 5 bar or greater, about 10 bar or greater, about 15 bar or greater, about 18 bar or greater. For example, about 19 bar, about 20 bar, about 21 bar, about 22 bar, about 23 bar, about 24 bar, about 25 bar, about 26 bar, about 27 bar, about 28 bar, about 29 bar, or greater. The present composition preferably is subjected to temperatures of from about 150° C. or greater, about 160° C. or greater, about 170° C. or greater, about 180° C. or greater, about 190° C. or greater, about 200° C. or greater, about 210° C. or greater. The present composition preferably is subjected to the elevated temperature for about 5 minutes or more, about 10 minutes or more, about 15 minutes or more, about 20 minutes or more, about 25 minutes or more, about 30 minutes or more, about 35 minutes or more, about 40 minutes or more, about 45 minutes or more, about 50 minutes or more, about 55 minutes or more, about 60 minutes or more, about 65 minutes or more. The present composition preferably is subjected to the elevated temperature for about 300 minutes or less, about 270 minutes or less, about 240 minutes or less, about 210 minutes or less, about 180 minutes or less, about 150 minutes or less, about 120 minutes or less. For example, the present composition can be subjected to the elevated temperature for about 30 to about 100 minutes. The present organosolv extraction may be a 'vapor' extraction. That is, an extraction where the solid is not fully submerged in the solvent mixture and the extraction is carried out by both a liquid and vapor phases.

The aromatic compounds may be recovered by any suitable means. For example, the solvent may be evaporated to precipitate the compounds. The compounds in the spent liquor can be recovered chromatographically followed by recrystallization or precipitation, dilution of the spent liquor with acidified water followed by filtration, centrifugation or tangential filtration, liquid/liquid extraction, among others.

The present aromatic compounds may be recovered in a single step or may be recovered in stages to provide compounds having different properties. The precipitated aromatic compounds do not seem to be sticky and are generally easy to filter.

The present compounds may be recovered for the present compositions by quenching the cooked mixture. For example, cold water may be added to the mixture in a ratio of 2 or more to 1 ($H_2O$ to extraction mixture).

The present disclosure provides lignin derivatives which give surprisingly good properties when formulated in phenol formaldehyde resins. While not wishing to be bound by theory it is believed that the present aromatic compounds have a surprisingly low z-average molecular weight (Mz).

The present disclosure provides lignin derivative having a Mz of about 3500 or less, about 3000 or less, about 2750 or less, about 2500 or less.

The present disclosure provides lignin derivatives having a number average molecular weight (Mn) of about 3000 or less, about 2000 or less, about 1000 or less, about 900 or less, about 800 or less, about 700 or less, about 600 or less.

The present disclosure provides lignin derivatives having a weight average molecular weight (Mw) of about 2000 or less, about 1800 or less, about 1600 or less, about 1400 or less, about 1300 or less.

The present disclosure provides lignin derivatives having a polydispersity of from about 0.1 to about 8; about 0.5 to about 4; from about 0.6 to about 3; from about 0.7 to about 2; from about 0.8 to about 1.5; from about 0.9 to about 1.2; about 1.

The present aromatic compounds may be used for a variety of applications such as, for example, phenol formaldehyde resins, phenol furan resins, in particular foundry resins, urea formaldehyde resins, epoxy resins, other resol or novolac resins, other resins, environmental remediation of hydrocarbon spills, remediation of other contamination, waste water treatment for recycling or reclaiming, antioxidants, wax emulsions, carbon fibres, surfactants, coatings, among others.

The present aromatic compounds may be used as precursors for furan-phenolic foundry resins or other furan resins. In foundry resins furfuryl alcohol is used in the synthesis of furan resins and the present aromatic compounds could replace phenol and/or some of the furfuryl alcohol or the resin precursor itself synthesized by reacting phenol with furfuryl alcohol.

It is contemplated that any embodiment discussed in this specification can be implemented or combined with respect to any other embodiment, method, composition or aspect of the invention, and vice versa.

All citations are herein incorporated by reference, as if each individual publication was specifically and individually indicated to be incorporated by reference herein and as though it were fully set forth herein. Citation of references herein is not to be construed nor considered as an admission that such references are prior art to the present invention.

The invention includes all embodiments, modifications and variations substantially as hereinbefore described and with reference to the examples and figures. It will be apparent to persons skilled in the art that a number of variations and modifications can be made without departing from the scope of the invention as defined in the claims. Examples of such modifications include the substitution of known equivalents for any aspect of the invention in order to achieve the same result in substantially the same way.

The present invention will be further illustrated in the following examples. However it is to be understood that these examples are for illustrative purposes only, and should not be used to limit the scope of the present invention in any manner.

EXAMPLES

Samples of 100 g of lignaceaus residue from a steam-explosion process followed by simultaneous saccharification and fermentation was obtained. The samples contained approximately 62-66% lignin and 25-26% carbohydrate. The mixed with an organic solvent (aqueous ethanol) to form an extraction mixture. The residue comprised the composition was placed in a vessel (Parr reactor, 2 L) and subjected to an elevated temperature of 100° C., 165° C., or 200° C. for a varying amount of time. The resultant extraction liquor was filtered to separate the solid residue from the liquid residue. Lignin derivatives were precipitated from the extraction liquor by drop-wise precipitation in 2x amount of water. The conditions/results are shown in the tables below.

|   | L:Residue (w/dry w) | EtOH in liquid % (w/w) | Acid, % of residue | Pressure (psi) | Final liquor pH | T (° C.) | Time (min) | Residue (% of feestock) | Precipitated Lignin (% of feestock) | Solid Lignin Recovered |
|---|---|---|---|---|---|---|---|---|---|---|
| | | | | | Dry Substrate | | | | | |
| 1 | 1.0(1) | 7.8:1 | 50 | 2.0 | 173 | 3.1 | 165 | 120 | 88.1 | 7.9 | 14.0 |
| 2 | 1.1(1) | 5:1 | 57 | 2.5 | 400 | 3.0 | 200 | 80 | 71.7 | 14.6 | 25.8 |
| | | | | | Crushed Wet Substrate | | | | | |
| 3 | 1.2(1) | 5:1 | 57 | 2.5 | 400 | 3.4 | 200 | 80 | 64.3 | 19.0 | 33.6 |
| 4 | 1.4(1) | 10:1 | 70 | 1.5 | 29 | 3.96 | 100 | 120 | 73.8 | 11.2 | 19.8 |
| 5 | 1.5(1) stirred | 10:1 | 70 | 3.0 | 187 | 3.33 | 165 | 120 | 64.4 | 16.4 | 29.0 |
| 6 | 1.6(1) stirred | 10:1 | 70 | 4.0 | 186 | 2.88 | 165 | 120 | 62.5 | 19.5 | 34.4 |

| | Precipitated lignin (PL) | | | | | | | | | | | |
|---|---|---|---|---|---|---|---|---|---|---|---|---|
| | recov/ dissolved | Glc in PL (%) | AIL % (w/w) PL | ASL in PL (%) | Ash in PL AIL (%) | Ash in PL (%) | Lignin in PL (% PL) | Mn | Mw | Mz | D | Tg | Acid Number |
| 1 | 2.2 | 0.18 | 93.85 | 2.07 | 0.00 | n/a | 95.9 | 1001 | 1734 | 2952 | 1.73 | 122.6 | 18.6 |
| 2 | 0.86 | 0.18 | 94.15 | 2.37 | 0.03 | n/a | 96.5 | 914 | 1794 | 3274 | 1.96 | 124.2 | 15.7 |
| 3 | 0.98 | 0.09 | 92.45 | 2.38 | 0.00 | 0.04 | 94.8 | 946 | 1768 | 3072 | 1.87 | 117.7 | |
| 4 | 0.84 | 0.20 | 93.63 | 1.46 | n/a | 0.02 | 95.1 | | | | | | 20.5 |
| 5 | 0.73 | 0.32 | 93.55 | 1.41 | n/a | 0.00 | 95.0 | | | | | | 21.5 |
| 6 | 0.82 | 0.16 | 92.73 | 1.26 | n/a | 0.00 | 94.0 | | | | | | 22.1 |

| Feedstock | sample | CO-nc mmol/g | CO-conj mmol/g | CO-tot mmol/g | OH-pr mmol/g | OH-sec mmol/g | OH-al mmol/g | OH-ph mmol/g | OH-tot mmol/g | COOR-al mmol/g |
|---|---|---|---|---|---|---|---|---|---|---|
| Lignaceaus Residue | RT extraction | 0.53 | 0.69 | 1.22 | 3.17 | 2.72 | 5.89 | 5.06 | 10.94 | 1.56 |
| | 1.2(1) | 0.39 | 0.47 | 0.86 | 1.33 | 0.44 | 1.78 | 4.94 | 6.72 | 0.78 |

| feedstock | sample | COOR-conj mmol/g | COOR-tot mmol/g | OMe mmol/g | O-Et mmol/g | b-5 mmol/g | b-b mmol/g | b-O-4 mmol/g | S/G | DC |
|---|---|---|---|---|---|---|---|---|---|---|
| Lignaceaus Residue | RT extraction | 0.17 | 1.72 | 8.25 | 0.00 | 0.25 | 0.33 | 0.72 | 1.63 | 26 |
| | 1.2(1) | 0.22 | 1.00 | 6.97 | 0.28 | 0.28 | 0.22 | 0.33 | 1.32 | 40 |

Chemical nature of the extracted lignins is similar to that of high purity lignin produced from native wood extractions.

The invention claimed is:

1. A composition comprising a lignocellulosic biomass and an organic solvent mixture, wherein the lignocellulosic biomass comprises 35% to 66% of lignin material, 18% to 50% of carbohydrate, and 5% to 9% of recalcitrant cellulose that is hydrolyzed to glucose at a rate of less than 10% a day when incubated at 40° C. in the presence of 20 mg cellulase protein per g cellulose substrate, and wherein the organic solvent mixture comprises about less than 80% of an organic solvent and the remainder water.

2. The composition according to claim 1, wherein the organic solvent mixture comprises about 45-60% of the organic solvent.

3. The composition according to claim 1, wherein the composition has a viscosity of 5000 cps or less, 3000 cps or less, or 1500 cps or less.

4. The composition according to claim 1, wherein the weight ratio of solvent to lignocellulosic biomass is from about 10:1 to about 3:1.

5. The composition according to claim 1, wherein the pH of the composition is from about 1 to about 3.

6. The composition according to claim 1, wherein the composition comprises from about 1.5% to about 2.5% of an acid, based on the dry weight of the lignocellulosic biomass.

7. The composition according to claim 1, wherein the lignocellulosic biomass comprises softwood feedstock.

8. The composition according to claim 1, wherein the organic solvent is ethanol, methanol, propanol, or a combination thereof.

9. The composition according to claim 1, wherein the organic solvent mixture is an ethanol/water mixture.

10. A process comprising:
    i. obtaining a composition according to claim 1;
    ii. subjecting the composition to an elevated temperature and an elevated pressure, and optionally adding an acid;
    iii. maintaining the elevated temperature and the elevated pressure for a period of time; and
    iv. recovering aromatic compounds from the solvent.

11. The process according to claim 10 wherein the process is a continuous process.

12. The process according to claim 10 wherein the elevated temperature is about 180° C. or greater.

13. The process according to claim 10 wherein the elevated pressure is about 1 bar or greater.

14. The process according to claim 10 wherein the elevated pressure is about 35 bar or less.

15. The process according to claim 10 wherein the period of time is 30 minutes or longer.

16. The process according to claim 10 wherein the elevated temperature is about 140° C. to about 165° C. and the period of time is about 30 minutes to about 150 minutes.

17. The process according to claim 10 wherein the elevated pressure is about 18 bar or less.

* * * * *